United States Patent
Wang

(10) Patent No.: US 9,368,112 B2
(45) Date of Patent: Jun. 14, 2016

(54) METHOD AND APPARATUS FOR DETECTING A VOICE ACTIVITY IN AN INPUT AUDIO SIGNAL

(71) Applicant: Huawei Technologies Co., Ltd., Shenzhen, Guangdong (CN)

(72) Inventor: Zhe Wang, Beijing (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 435 days.

(21) Appl. No.: 13/891,198

(22) Filed: May 10, 2013

(65) Prior Publication Data

US 2013/0304464 A1 Nov. 14, 2013

Related U.S. Application Data

(63) Continuation of application No. PCT/CN2010/080227, filed on Dec. 24, 2010.

(51) Int. Cl.
*G10L 15/20* (2006.01)
*G10L 25/78* (2013.01)

(52) U.S. Cl.
CPC .............. *G10L 15/20* (2013.01); *G10L 25/78* (2013.01); *G10L 2025/786* (2013.01)

(58) Field of Classification Search
CPC ....... G10L 25/78; G10L 19/012; G10L 19/24; G10L 19/20; G10L 21/0208; G10L 19/0204; G10L 21/0232; G10L 25/87; G10L 19/09; G10L 19/22; G10L 2025/783; G10L 2025/935; G10L 2025/786; G10L 15/20
See application file for complete search history.

(56) References Cited

U.S. PATENT DOCUMENTS

| | | | | |
|---|---|---|---|---|
| 5,450,484 A * | 9/1995 | Hamilton | ...................... | 379/351 |
| 5,509,102 A * | 4/1996 | Sasaki | ...................... | G10L 25/78 704/212 |
| 5,537,509 A * | 7/1996 | Swaminathan | ....... | G10L 19/012 704/214 |
| 5,649,055 A | 7/1997 | Gupta et al. | | |
| 5,689,615 A * | 11/1997 | Benyassine | ............. | G10L 19/18 704/214 |
| 5,819,218 A * | 10/1998 | Hayata | .................. | G10L 19/012 704/208 |
| 6,044,342 A * | 3/2000 | Sato et al. | ...................... | 704/233 |
| 6,453,291 B1 | 9/2002 | Ashley | | |
| 6,480,823 B1 * | 11/2002 | Zhao et al. | ..................... | 704/226 |
| 6,889,187 B2 * | 5/2005 | Zhang | ............................ | 704/253 |
| 7,003,452 B1 * | 2/2006 | Lubiarz et al. | ................ | 704/210 |
| 7,653,537 B2 * | 1/2010 | Padhi et al. | .................... | 704/218 |
| 7,769,585 B2 | 8/2010 | Wahab | | |
| 7,983,906 B2 * | 7/2011 | Gao | ........................ | G10L 25/78 704/213 |
| 8,374,861 B2 * | 2/2013 | Hetherington | ................ | 704/233 |

(Continued)

FOREIGN PATENT DOCUMENTS

| CN | 101320559 A | 12/2008 |
|---|---|---|
| CN | 101379548 A | 3/2009 |

(Continued)

*Primary Examiner* — Abdelali Serrou
(74) *Attorney, Agent, or Firm* — Huawei Technologies Co., Ltd

(57) ABSTRACT

The disclosure provides a method and an apparatus for detecting a voice activity in an input audio signal composed of frames. A noise characteristic of the input signal is determined based on a received frame of the input audio signal. A voice activity detection (VAD) parameter is derived based on the noise characteristic of the input audio signal using an adaptive function. The derived VAD parameter is compared with a threshold value to provide a voice activity detection decision. The input audio signal is processed according to the voice activity detection decision.

17 Claims, 3 Drawing Sheets

(56) References Cited

U.S. PATENT DOCUMENTS

| | | | |
|---|---|---|---|
| 2001/0014857 A1* | 8/2001 | Wang | 704/231 |
| 2002/0116186 A1* | 8/2002 | Strauss et al. | 704/233 |
| 2002/0188445 A1* | 12/2002 | Li | 704/233 |
| 2003/0212550 A1* | 11/2003 | Ubale | G10L 19/00 704/215 |
| 2004/0030544 A1 | 2/2004 | Ramabadran | |
| 2007/0110263 A1* | 5/2007 | Brox | 381/110 |
| 2008/0159560 A1 | 7/2008 | Song et al. | |
| 2009/0055173 A1* | 2/2009 | Sehlstedt | 704/233 |
| 2009/0089053 A1* | 4/2009 | Wang et al. | 704/233 |
| 2010/0088094 A1 | 4/2010 | Wang | |
| 2010/0211385 A1* | 8/2010 | Sehlstedt | 704/214 |
| 2011/0035213 A1* | 2/2011 | Malenovsky et al. | 704/208 |
| 2011/0123019 A1* | 5/2011 | Gowreesunker et al. | 379/406.09 |
| 2011/0264447 A1* | 10/2011 | Visser et al. | 704/208 |
| 2011/0264449 A1* | 10/2011 | Sehlstedt | 704/226 |
| 2012/0185248 A1 | 7/2012 | Sehlstedt | |
| 2012/0215536 A1* | 8/2012 | Sehlstedt | G10L 25/78 704/246 |

FOREIGN PATENT DOCUMENTS

| | | |
|---|---|---|
| CN | 101583996 A | 11/2009 |
| CN | 101681619 A | 3/2010 |
| DE | 10244699 A1 | 4/2004 |
| EP | 2113908 A1 | 11/2009 |
| EP | 2159788 A1 | 3/2010 |

* cited by examiner

METHOD AND APPARATUS FOR DETECTING A VOICE ACTIVITY IN AN INPUT AUDIO SIGNAL

CROSS REFERENCE TO RELATED APPLICATIONS

This application is a continuation of International Patent Application No. PCT/CN2010/080227, filed on Dec. 24, 2010, which is hereby incorporated by reference in its entirety.

TECHNICAL FIELD

The disclosure relates to a method and an apparatus for adaptively detecting a voice activity in an input audio signal composed of frames, and in particular to a voice activity detection method and apparatus using non-linearly processed sub-band segmental signal to noise ratio parameters.

BACKGROUND

Voice activity detection (VAD) is generally a technique for detecting a voice activity in a signal. Voice activity detectors are widely used in the telecommunication field. A basic function of a voice activity detector is to detect, in communication channels, the presence or absence of active signals, such as speech or music signals. The voice activity detector can be provided within a communication network, wherein the network can decide to compress transmission bandwidth in periods where active signals are absent, or to perform other processing depending on a voice activity detection decision (VADD) indicating whether there is an active signal or not. A voice activity detector can compare a feature parameter or a set of feature parameters extracted from the input signal to corresponding threshold values, and determine whether the input signal includes an active signal or not based on the comparison result. The performance of a voice activity detector depends to a high degree on the choice of the used feature parameters.

There have been many feature parameters proposed for voice activity detection, such as energy based parameters, spectral envelope based parameters, entropy based parameters, higher order statistics based parameters and so on. In general, energy based parameters provide a good voice activity detection performance. In recent years, sub-band signal to noise ratio (SNR) based parameters as a kind of energy based parameters have been widely used in the telecommunication field. In sub-band SNR based voice activity detectors, the SNR for each frequency sub-band of an input frame is detected, and the SNRs of all sub-bands are added to provide a segmental SNR (SSNR). The SSNR can be compared with a threshold value to make a voice activity detection decision (VADD). The used threshold is usually a variable, which is adaptive to a long term SNR (LSNR) of the input signal or a level of background noise.

In a recently completed ITU-T (International Telecommunication Union Telecommunication Standardization Sector) Recommendation G.720.1 (G.720.1 hereinafter), the conventional SSNR parameter has been improved by applying a non-linear processing to get a modified SSNR (MSSNR). The calculated MSSNR is also compared to a threshold which is determined from a threshold table according to the LSNR of the input signal, the background noise variation and the voice activity detection (VAD) operating point, where the VAD operating point defines the tradeoff of the VAD decision between active and inactive detection, for example a quality-preferred operating point will make the VAD favor the detection of active signals and vice versa.

Although the MSSNR parameter used by G.720.1 does increase the performance of the voice activity detection, the VAD performance in a non-stationary and low SNR background environment still needs improvement. Conventional voice activity detectors are designed to balance their performances in various background noise conditions. Accordingly, conventional voice activity detectors have a performance which is sub-optimal for specific conditions and in particular in a non-stationary and low SNR background environment.

SUMMARY

The disclosure provides, according to a first aspect, a method for adaptively detecting a voice activity in an input audio signal. The input audio signal is composed of frames. The method includes the following:

determining a noise characteristic of the input signal based at least on a received frame of the input audio signal;

deriving a VAD parameter adapted to or selected dependent on the noise characteristic of the input audio signal; and comparing the derived VAD parameter with a threshold value to provide a voice activity detection decision.

Implementation forms of the first aspect may use energy based parameters, spectral envelope based parameters, entropy based parameters or higher order statistics based parameters as VAD parameters.

In a possible implementation of the first aspect of the present disclosure, a method for adaptively detecting a voice activity in an input audio signal, which is composed of frames, comprises the steps of:

determining a noise characteristic of the input signal based at least on a received frame of the input audio signal;

dividing the received frame of the input audio signal into several sub-bands;

obtaining a signal to noise ratio (SNR) for each s of the received frame;

for each sub-band, calculating a sub-band specific parameter based on the respective sub-band's SNR using an adaptive function, wherein at least one parameter of the adaptive function is selected dependent on the noise characteristic of the input audio signal;

deriving a modified segmental SNR as a VAD parameter by adding the sub-band specific parameter of each sub-band; and comparing the derived modified segmental SNR with a threshold value to provide a VAD decision.

In a possible implementation of the first aspect of the present disclosure, the determined noise characteristic of the input audio signal is formed by a long term SNR of the input audio signal.

In a further possible implementation of the first aspect of the present disclosure, the determined noise characteristic of the input audio signal is formed by a background noise variation of the input audio signal.

In a still further possible implementation of the first aspect of the present disclosure, the determined noise characteristic of the input audio signal is formed by a combination of the long term SNR and the background noise variation of the input audio signal.

In an implementation of the first aspect of the present disclosure, the adaptive function used for calculating the sub-band specific parameter is formed by a non-linear function.

In a possible implementation of the method for adaptively detecting a voice activity in an input audio signal according to the first aspect of the present disclosure, a SNR for each sub-band of the input frame is obtained by obtaining a signal energy for each sub-band, e.g. a signal energy for each sub-band of the input frame.

In a further possible implementation of the method for adaptively detecting a voice activity in an input audio signal according to the first aspect of the present disclosure, the SNR for each sub-band of the input frame is obtained by estimating a background noise energy for each sub-band.

In a further possible implementation of the method for adaptively detecting a voice activity in an input audio signal according to the first aspect of the present disclosure, the SNR for each sub-band of the input frame is obtained by calculating the SNR for each sub-band depending on the signal energy and the background noise energy of the respective sub-band.

In a further possible implementation of the method for adaptively detecting a voice activity in an input audio signal according to the first aspect of the present disclosure, the modified SSNR (mssnr) is calculated by adding sub-band specific parameters (sbsp) as follows:

$$mssnr = \sum_{i=0}^{N} sbsp(i)$$

In a possible implementation of the method for adaptively detecting a voice activity in an input audio signal according to the first aspect of the present disclosure, the modified segmental SNR (mssnr) is calculated as follows:

$$mssnr = \sum_{i=o}^{N} (f(snr(i)) + \alpha)^{\beta}$$

wherein snr(i) is a SNR of the $i^{th}$ sub-band of the input frame, N is the number of frequency sub-bands into which the input frame is divided, $(f(snr(i))+\alpha)^{\beta}$ is the adaptive function (AF) used to calculate the sub-band specific parameter sbsp(i), and α, β are two configurable variables of the adaptive function (AF).

In a possible implementation of the method for adaptively detecting a voice activity in an input audio signal according to the first aspect of the present disclosure, the first variable α of the adaptive function (AF) may depend on a long term SNR (lsnr) of the input audio signal as follows:

$$\alpha = g(i, lsnr)$$

wherein g(i, lsnr) is a linear or non-linear function,
and the second variable β of the adaptive function (AF) may depend on the long term SNR (lsnr) and φ as follows:

$$\beta = h(lsnr, \phi)$$

wherein h(lsnr, φ) is a non-linear function and φ=f(snr(i))+α.

In a further implementation of the method for adaptively detecting a voice activity in an input audio signal according to the first aspect of the present disclosure, the first variable α of the adaptive function (AF) may be calculated by:

$$\alpha = g(i, lsnr) = a(i)lsnr + b(i)$$

wherein a(i), b(i) are real numbers depending on a sub-band index i,
and the second variable β of the adaptive function (AF) may be calculated by:

$$\beta = h(lsnr, \varphi) = \begin{cases} \beta_1 & \varphi \geq d \text{ and } lsnr > e_2 \\ \beta_2 & \varphi \geq d \text{ and } d_1 < lsnr \leq e_2 \\ \beta_3 & \varphi \geq d \text{ and } lsnr \leq e_1 \\ \beta_4 & \text{otherwise} \end{cases}$$

wherein $\beta_1 < \beta_2 < \beta_3$ and $\beta_4$ and d and $e_1 < e_2$ are integer or floating numbers, and lsnr is the long term SNR of the input audio signal.

In a possible implementation of the method for adaptively detecting a voice activity in an input audio signal according to the first aspect of the present disclosure, the derived modified segmental SNR (mssnr) is compared with a threshold value (thr) being set to:

$$thr = \begin{cases} k_1 & lsnr > e_2 \\ k_2 & e_1 < lsnr \leq e_2 \\ k_3 & lsnr \leq e_1 \end{cases}$$

wherein $k_1 > k_2 > k_3$ and $e_1 < e_2$ are integer or floating numbers, and the voice activity detection decision (VADD) is generated as follows:

$$VADD = \begin{cases} 1 & mssnr > thr \\ 0 & mssnr \leq thr \end{cases}$$

wherein VADD=1 indicates an active frame with voice activity being present, and VADD=0 indicates a passive frame with voice activity being absent.

In a possible implementation of the method for adaptively detecting a voice activity input audio signal according to the first aspect of the present disclosure, the first variable α of the adaptive function (AF) may be calculated by:

$$\alpha = g(i, lsnr, \epsilon) = a(i)lsnr + b(i) + c(\epsilon)$$

wherein a(i), b(i) are real numbers depending on a sub-band index i, and c(ϵ) is a real number depending on the estimated fluctuation of the background noise of the input audio signal, and the second variable β of the adaptive function (AF) may be calculated by:

$$\beta = h(lsnr, \varphi, \varepsilon) = \begin{cases} \beta_1 & \varphi \geq d \text{ and } lsnr > e_2 \text{ and } \varepsilon \leq p \\ \beta_2 & \varphi \geq d \text{ and } lsnr > e_2 \text{ and } \varepsilon > p \\ \beta_3 & \varphi \geq d \text{ and } e_1 < lsnr < e_2 \text{ and } \varepsilon \leq p \\ \beta_4 & \varphi \geq d \text{ and } e_1 < lsnr < e_2 \text{ and } \varepsilon > p \\ \beta_5 & \varphi \geq d \text{ and } lsnr \leq e_1 \text{ and } \varepsilon \leq p \\ \beta_6 & \varphi \geq d \text{ and } lsnr \leq e_1 \text{ and } \varepsilon > p \\ \beta_7 & \varphi < d \end{cases}$$

wherein φ=f(snr(i))+α,ϵ is the estimated fluctuation of the background noise, and d and $e_1 < e_2$ and p are integer or floating numbers.

In a possible implementation of a method for adaptively detecting a voice activity in an input audio signal according to the first aspect of the present disclosure, the derived modified segmental SNR (mssnr) is compared with a threshold value (thr) being set to:

$$thr = \begin{cases} q_1 + r_1 \cdot \text{Min}\left[\dfrac{lsnr - v_1}{W_1}, 1\right] & lsnr > e_2 \\ q_2 + r_2 \cdot \text{Min}\left[\dfrac{lsnr - v_2}{W_2}, 1\right] & e_1 < lsnr \le e_2 \\ q_3 + r_3 \cdot \text{Max}\left[\dfrac{lsnr - v_3}{W_3}, 1\right] & lsnr \le e_1 \end{cases}$$

wherein $q_1, q_2, q_3$ and $r_1, r_2, r_3$ and $e_1 < e_2$ and $v_1, v_2, v_3$ and $W_1, W_2, W_3$ are integer or floating numbers,
and the voice activity detection decision (VADD) is generated as follows:

$$VADD = \begin{cases} 1 & mssnr > thr \\ 0 & mssnr \le thr \end{cases}$$

wherein VADD=1 indicates an active frame with voice activity being present, and VADD=0 indicates a passive frame with voice activity being absent.

The disclosure further provides according to a second aspect a voice activity detection (VAD) apparatus for detecting a voice activity in an input audio signal composed of frames.

The VAD apparatus comprises:
a VAD parameter calculation unit, configured to calculate a signal to noise ratio (SNR) for each sub-band of a received frame of the input audio signal, calculate a sub-band specific parameter based on the respective sub-band SNR for each sub-band using an adaptive function (AF), and derive a modified segmental SNR by adding the sub-band specific parameter of each sub-band; and
a VAD decision generation unit, configured to generate a VAD decision (VADD) by comparing the modified segmental SNR with a threshold value.

In a possible implementation of the VAD apparatus according to the second aspect of the present disclosure, the apparatus further comprises a noise characteristic determination unit which determines a noise characteristic of the input audio signal based at least on a received frame of the input audio signal.

In a possible implementation of the VAD apparatus according to the second aspect of the present disclosure, the noise characteristic determination unit comprises a long term SNR estimation unit, configured to calculate a long term SNR of the input audio signal.

In a further possible implementation of the VAD apparatus according to the second aspect of the present disclosure, the noise characteristic determination unit comprises a background noise variation estimation unit, configured to calculate a stationarity or fluctuation of the background noise of the input audio signal.

In a further possible implementation of the VAD apparatus according to the second aspect of the present disclosure, the noise characteristic determination unit comprises a long term SNR estimation unit, configured to calculate a long term SNR of the input audio signal, and a background noise variation estimation unit, configured to calculate a stationarity or fluctuation of the background noise of the input audio signal.

In a further possible implementation of the VAD apparatus according to the second aspect of the present disclosure, the adaptive function (AF) is selected dependent on at least one noise characteristic determined by the noise characteristic determination unit.

The disclosure further provides an audio signal processing device according to a third aspect of the present disclosure, wherein the audio signal processing device comprises an audio signal processing unit for processing an audio input signal depending on a VAD decision (VADD) provided by the VAD apparatus according to the second aspect of the present disclosure.

BRIEF DESCRIPTION OF DRAWINGS

In the following, possible implementations of different aspects of the present disclosure are described with reference to the enclosed figures in more detail.

DETAILED DESCRIPTION

Figure 1:
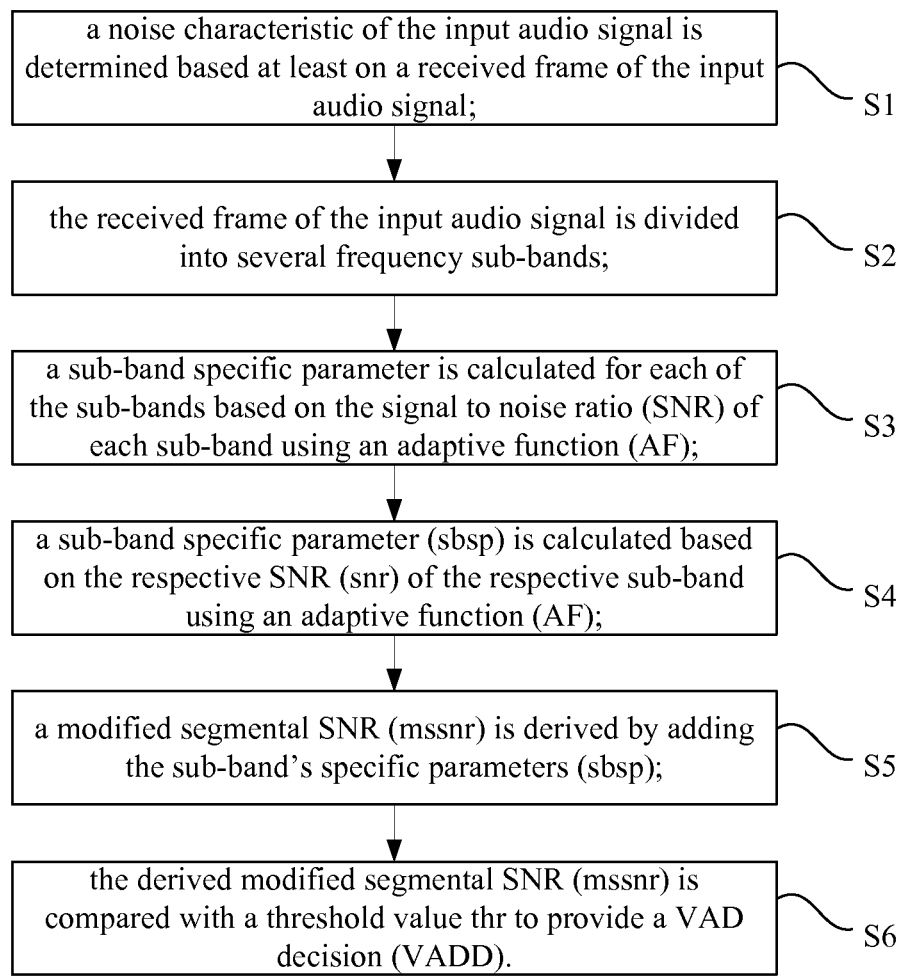
FIG. 1 shows a flow chart of a method for adaptively detecting a voice activity in an input audio signal according to a first aspect of the present disclosure.

FIG. 1 shows a flow chart of a possible implementation of a method for adaptively detecting a voice activity in an input audio signal, according to a first aspect of the present disclosure.

The input audio signal is composed of signal frames. In a first step S1, a noise characteristic of the input audio signal is determined based at least on a received frame of the input audio signal.

In a possible implementation, the input signal is segmented into frames of a predetermined length of e.g. 20 ms, and is inputted frame by frame. In other implementations, the length of the input frame may vary. The noise characteristic of the input audio signal determined in the step S1 may be a long term signal to noise ratio (LSNR) calculated by a LSNR estimation unit. In another possible implementation, the noise characteristic determined in the step S1 is formed by a background noise variation, calculated by a background noise variation estimation unit which calculates a stationarity or fluctuation $\epsilon$ of the background noise of the input audio signal. It is also possible that the noise characteristic determined in the step S1 includes both the LSNR and the background noise variation.

In a further step S2, the received frame of the input audio signal is divided into several frequency sub-bands.

In a further step S3, a sub-band specific parameter is calculated for each of the sub-bands based on the signal to noise ratio (SNR) of each sub-band using an adaptive function (AF).

In a possible implementation, a power spectrum is obtained for each input frame through a fast Fourier transformation (FFT), and the obtained power spectrum is divided into a predetermined number of sub-bands with non-linear widths. Energies for each sub-band are calculated, wherein the energy for each sub-band of the input frame can in a possible implementation be formed by a smoothed energy that is formed by a weighted average of the energies for the same sub-band between the input frame and at least one previous frame. In a possible implementation of the first aspect of the present disclosure, the sub-band SNR of $i^{th}$ sub-band (snr(i)) can be calculated as the modified logarithmic SNR of the frequency sub-band:

$$snr(i) = \log_{10}\left(\frac{E(i)}{E_n(i)}\right)$$

wherein E(i) is the energy of $i^{th}$ sub-band of the input frame, and $E_n(i)$ is the estimated background noise energy of the $i^{th}$ sub-band. The estimated background noise can be calculated by a background noise estimation unit where the estimated energy of each sub-band of the background noise is calculated by moving-averaging the energies of each sub-band among background noise frames detected. This can be expressed as:

$$E_n(i) = \lambda \cdot E_n(i) + (1-\lambda) \cdot E(i)$$

where E(i) is the energy of the $i^{th}$ sub-band of the frame detected as background noise, λ is a "forgetting factor" usually in a range between 0.9-0.99.

After having obtained a SNR (snr) for each sub-band of the input frame in step S3, a sub-band specific parameter (sbsp) is calculated in step S4 based on the respective SNR (snr) of the respective sub-band using an adaptive function (AF). In a possible implementation of the method for adaptively detecting a voice activity, in an input audio signal, at least one parameter of the adaptive function (AF) is selected dependent of the determined noise characteristic of the input audio signal. The noise characteristic determined in step S1 can comprise a long term SNR and/or a background noise variation of the input audio signal. The adaptive function (AF) is a non-linear function.

In a possible implementation of the method for adaptively detecting a voice activity in an input audio signal according to the first aspect of the present disclosure, in step S5, a modified segmental SNR (mssnr) is derived by adding the sub-band's specific parameters (sbsp) as follows:

$$mssnr = \sum_{i=0}^{N} sbsp(i)$$

wherein N is the number of frequency sub-bands into which the input frame is divided, and sbsp(i) is a sub-band specific parameter calculated based on the sub-band's SNR for each sub-band using the adaptive function (AF).

In a possible implementation of the first aspect of the present disclosure, the modified segmental SNR (mssnr) is calculated as follows:

$$mssnr = \sum_{i=o}^{N} (f(snr(i)) + \alpha)^{\beta}$$

wherein snr(i) is the SNR of the $i^{th}$ sub-band of the input frame, N is the number of frequency sub-bands into which the input frame is divided and $AF = (f(snr(i)) + \alpha)^{\beta}$ is the adaptive function used to calculate the sub-band specific parameter sbsp(i), and α, β are two configurable variables of the adaptive function (AF).

In a possible implementation of the first aspect of the present disclosure, the first variable α of the adaptive function (AF) depends on a long term SNR (lsnr) of the input audio signal as follows:

$$\alpha = g(i, lsnr)$$

wherein g(i, lsnr) is a linear or non-linear function,
and the second variable β of the adaptive function (AF) depends on the long term SNR (lsnr) and a value φ as follows:

$$\beta = h(lsnr, \phi)$$

wherein h(lsnr, φ) is a non-linear function and $$\phi = f(snr(i)) + \alpha$$

In a possible implementation of the method according to the first aspect of the present disclosure, the first variable α of the adaptive function (AF) may be calculated by:

$$\alpha = g(i, lnsr) = a(i)lsnr + b(i)$$

wherein a(i), b(i) are real numbers depending on a sub-band index i,
and the second variable β of the adaptive function (AF) may be calculated by:

$$\beta = h(lsnr, \varphi) = \begin{cases} \beta_1 & \varphi \geq d \text{ and } lsnr > e_2 \\ \beta_2 & \varphi \geq d \text{ and } e_1 < lsnr \leq e_2 \\ \beta_3 & \varphi \geq d \text{ and } lsnr \leq e_1 \\ \beta_4 & \text{otherwise} \end{cases}$$

wherein $\beta_1 < \beta_2 < \beta_3$ and $\beta_4$ and d as well as $e_1 < e_2$ are integer or floating numbers and wherein lsnr is the long term SNR of the input audio signal.

In a possible specific implementation, $\beta_1 = 4$, $\beta_2 = 10$, $\beta_3 = 15$ and $\beta_4 = 9$. In this specific implementation, d is set to 1, and $e_1 = 8$ and $e_2 = 18$.

The modified segmental SNR (msnr) is derived in step S5 by adding the sub-band's specific parameters (sbsp). In a further step S6 of the implementation of the method for adaptively detecting a voice activity in an input audio signal as shown in FIG. 1, the derived modified segmental SNR (mssnr) is compared with a threshold value thr to provide a VAD decision (VADD).

In a possible implementation, the derived modified segmental SNR (mssnr) is compared with a threshold value thr which is set to:

$$thr = \begin{cases} k_1 & lsnr > e_2 \\ k_2 & e_1 < lsnr \leq e_2 \\ k_3 & lsnr \leq e_1 \end{cases}$$

wherein $k_1 > k_2 > k_3$ and $e_1 < e_2$ are integer or floating numbers, and wherein the VAD decision (VADD) is generated as follows:

$$VADD = \begin{cases} 1 & mssnr > thr \\ 0 & mssnr \leq thr \end{cases}$$

wherein VADD=1 indicates an active frame with voice activity being present, and VADD=0 indicates a passive frame with voice activity being absent.

In a possible specific implementation, $k_1 = 135$, $k_2 = 35$, $k_3 = 10$ and $e_1$ is set to 8 whereas $e_2$ is set to 18.

In a further possible implementation of the method for adaptively detecting a voice activity in an input audio signal, the first variable α of the adaptive function (AF) may be calculated by:

$$\alpha = g(i, lsnr, \epsilon) = a(i)lsnr + b(i) + c(\epsilon)$$

wherein a(i), b(i) are real numbers depending on a sub-band index i, and c(ε) is a real number depending on the estimated fluctuation of the background noise of the input audio signal, and wherein the second variable β of the adaptive function (AF) may be calculated by:

$$\beta = h(lnsr, \varphi, \varepsilon) = \begin{cases} \beta_1 & \varphi \geq d \text{ and } lsnr > e_2 \text{ and } \varepsilon \leq p \\ \beta_2 & \varphi \geq d \text{ and } lsnr > e_2 \text{ and } \varepsilon > p \\ \beta_3 & \varphi \geq d \text{ and } e_1 < lsnr < e_2 \text{ and } \varepsilon \leq p \\ \beta_4 & \varphi \geq d \text{ and } e_1 < lsnr < e_2 \text{ and } \varepsilon > p \\ \beta_5 & \varphi \geq d \text{ and } lsnr \leq e_1 \text{ and } \varepsilon \leq p \\ \beta_6 & \varphi \geq d \text{ and } lsnr \leq e_1 \text{ and } \varepsilon > p \\ \beta_7 & \varphi < d \end{cases}$$

wherein $\varphi = f(snr(i)) + \alpha$ and $\epsilon$ is the estimated fluctuation of the background noise and d and $e_1 < e_2$ and p are integer or floating numbers.

In a specific implementation the parameters are set as follows:

$$\beta_1 = 3, \beta_2 = 4, \beta_3 = 7, \beta_4 = 10, \beta_5 = 8, \beta_6 = 15, \beta_7 = 15, \text{and}$$

$$d = 1, e_1 = 8, e_2 = 18, p = 40.$$

In an implementation of the method adaptively detecting a voice activity in an input audio signal according to the first aspect of the present disclosure, the derived modified segmental SNR (mssnr) is compared with a threshold value (thr) being set to:

$$thr = \begin{cases} q_1 + r_1 \cdot \text{Min}\left[\frac{lsnr - v_1}{W_1}, 1\right] & lsnr > e_2 \\ q_2 + r_2 \cdot \text{Min}\left[\frac{lsnr - v_2}{W_2}, 1\right] & e_1 < lsnr \leq e_2 \\ q_3 + r_3 \cdot \text{Max}\left[\frac{lsnr - v_3}{W_3}, 1\right] & lsnr \leq e_1 \end{cases}$$

wherein $q_1, q_2, q_3$ and $r_1, r_2, r_3$ and $e_1 < e_2$ and $v_1, v_2, v_3$ and $W_1, W_2, W_3$ are integer or floating numbers.

In a specific implementation of the first aspect of the present disclosure, $q_1 = 20$, $q_2 = 30$, $q_3 = 9$ and $r_1 = 30$, $r_2 = 10$ and $r_3 = 2$. Further, $v_1 = 18$, $v_2 = 8$ and $v_3 = 5$ and $W_1 = 8$, $W_2 = 10$ and $W_3 = 3$. Further, the parameters $e_1$, $e_2$ are set to $e_1 = 8$ and $e_2 = 18$.

Accordingly, in a possible embodiment, not only a background noise estimation and a long term SNR estimation is performed but additionally also a background noise variation estimation is performed to determine a background noise fluctuation $\epsilon$ of the background noise of the input audio signal.

Two factors, $\alpha$, $\beta$ of the adaptive function (AF) adjust a trade-off of the discriminating power of the modified segmental SNR parameter. Different trade-offs signify that the detection is more favorable for either active or inactive detection for the received frames. Generally the higher the long term SNR of the input audio signal is the more favorable it is to adjust the modified segmental SNR for active detection by means of adjusting the corresponding coefficients $\alpha$, $\beta$ of the adaptive function.

The VAD decision performed in step S6 can further go through a hard hang-over procedure. A hard hang-over procedure forces the VAD decisions for several frames to be active immediately after the VAD decision obtained in step S6 changes from active to inactive.

In a possible implementation of the method for adaptively detecting a voice activity in an input audio signal according to the first aspect of the present disclosure, the background noise of the input audio signal is analyzed and a number representing the extent of stationarity or fluctuation of the background noise, denoted by $\epsilon$, is generated. This fluctuation $\epsilon$ of the background noise can be calculated, for example, by:

$$\epsilon = \omega \cdot \epsilon + (1 - \omega) \cdot ssnr_n$$

wherein $\omega$ is a forgetting factor usually between 0.9-0.99 and $ssnr_n$ is the summation of $snr(i)$ over all sub-bands of the frame detected as a background frame multiplied by a factor of e.g. 10.

Figure 2:
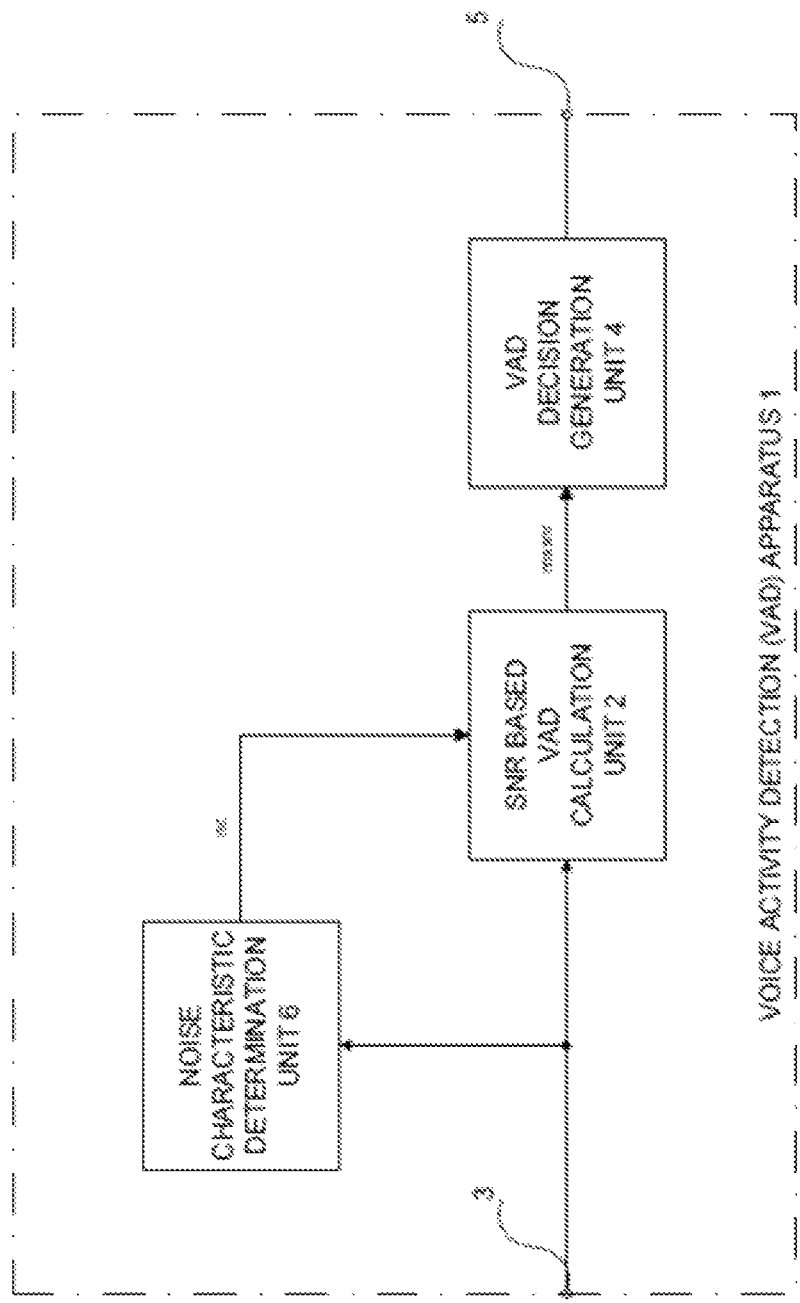
FIG. 2 shows a simplified block diagram of a voice activity detection (VAD) apparatus for detecting a voice activity in an input audio signal according to a second aspect of the present disclosure.

FIG. 2 shows a block diagram of a VAD apparatus 1 according to a second aspect of the present disclosure. The VAD apparatus 1 comprises a SNR based VAD parameter calculation unit 2 receiving an input audio signal applied to an input 3 of the VAD apparatus 1. The SNR based VAD parameter calculation unit 2 calculates a SNR to each sub-band of an applied input frame of the input audio signal and a sub-band's specific parameter based on the respective sub-band SNR for each sub-band using an adaptive function and derives a modified segmental SNR by adding the sub-band's specific parameters. The derived modified segmental SNR is applied by the SNR based VAD parameter calculation unit 2 to a VAD decision generation unit 4 of the VAD apparatus 1. The VAD decision generation unit 4 generates a VAD decision (VADD) by comparing the modified segmental SNR with a threshold value. The generated VAD decision (VADD) is output by the VAD apparatus 1 at an output 5.

In a possible implementation of the VAD apparatus 1 according to the second aspect of the present disclosure, the VAD detection apparatus 1 further comprises a noise characteristic determination unit 6 as shown in FIG. 2. The noise characteristic determination unit 6 determines a noise characteristic of the input signal based at least on a received input frame of the input audio signal applied to input 3 of the VAD apparatus 1. In an alternative implementation the noise characteristic is applied to the SNR based VAD parameter calculation unit 2 from an external noise characteristic determination entity. In a possible implementation of the VAD apparatus 1 according to the second aspect of the present disclosure the noise characteristic determination unit 6 as shown in FIG. 2 can comprise a long term SNR estimation unit which calculates a long term SNR of the input audio signal. In a further possible implementation, the noise characteristic determination unit 6 can also comprise a background noise variation estimation unit which calculates a stationarity or fluctuation $\epsilon$ of the background noise of the input audio signal. Accordingly, the noise characteristic provided by the noise characteristic determination unit 6 can comprise a long term SNR of the input audio signal and/or a stationarity or fluctuation of the background noise of the input audio signal. In a possible implementation an adaptive function used by the SNR based VAD parameter calculation unit 2 is selected dependent on at least one noise characteristic determined by the noise characteristic determination unit 6.

Figure 3:
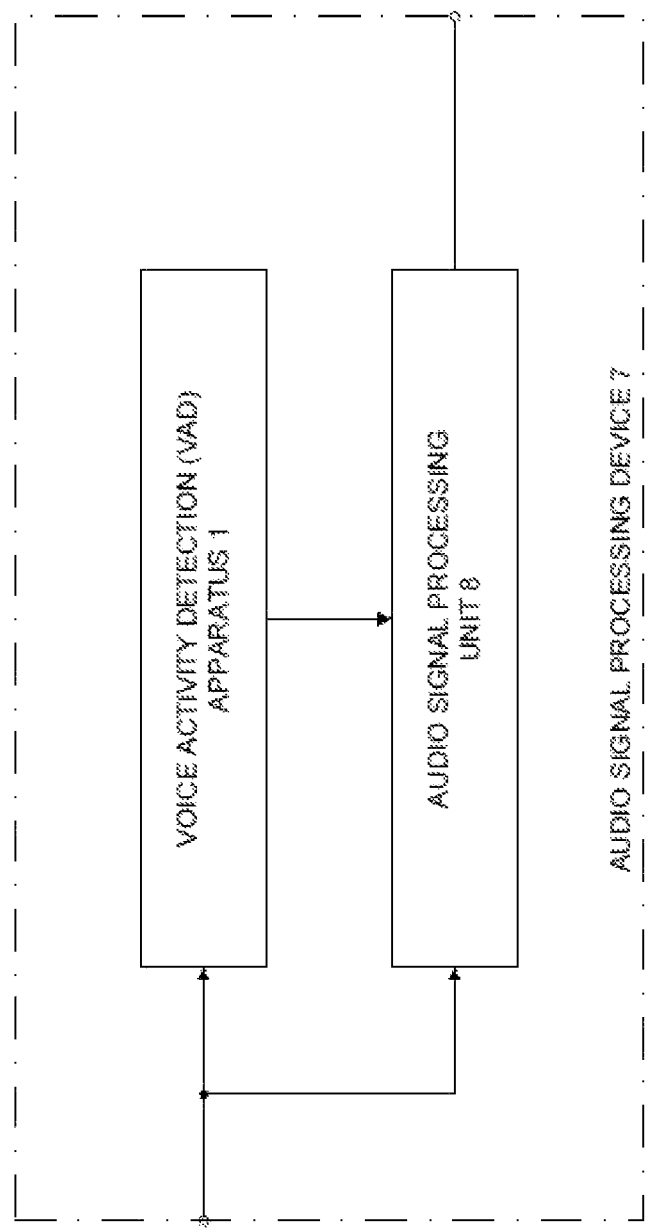
FIG. 3 shows a simplified block diagram of an audio signal processing device according to a third aspect of the present disclosure.

FIG. 3 shows a block diagram of an audio signal processing device 7 according to a third aspect of the present disclosure. The signal processing device 7 comprises the VAD apparatus 1 providing a VAD decision (VADD) for an audio signal processing unit 8 within the audio signal processing device 7. The audio signal processing of an input audio signal is performed by the audio signal processing unit 8 depending on the received VAD decision (VADD) generated by the VAD apparatus 1 according to the first aspect of the present disclosure. The audio signal processing unit 8 can perform for example an encoding of the input audio signal based on the VAD decision (VADD). The audio signal processing device 7 can form part of a speech communication device such as a mobile phone. Further, the audio signal processing device 7 can be provided within a speech communication system such as an audio conferencing system, an echo signal cancellation system, a speech noise reduction system, a speech recognition system or a speech encoding system. The VAD decision (VADD) generated by the VAD apparatus 1 can control in a possible implementation a discontinuous transmission DTX mode of an entity, for example an entity in an cellular radio system, for example a GSM or LTE or CDMA system. The VAD apparatus 1 can enhance the system capacity of a system such as a cellular radio system by reducing co-channel interferences. Furthermore, the power consumption of a portable digital device within a cellular radio system can be reduced significantly.

The invention claimed is:

1. A method for detecting a voice activity in an input audio signal within a communication system, wherein the input audio signal is composed of frames, the method comprising:
  receiving the input audio signal;
  determining a noise characteristic of the input audio signal based on the received frames of the input audio signal;
  dividing each of the received frames of the input audio signal into one or more frequency sub-bands;
  obtaining a signal to noise ratio for each of the sub-bands;
  calculating a sub-band specific parameter (sbsp) of each sub-band based on the signal to noise ratio of the sub-band using an adaptive function, wherein at least one parameter of the adaptive function is selected depending on the noise characteristic of the input audio signal;
  deriving a modified segmental signal to noise ratio (mssnr) as a voice activity detection (VAD) parameter by adding the calculated sub-band specific parameter (sbsp) of each sub-band;
  comparing the derived VAD parameter with a threshold value to provide a voice activity detection decision (VADD) to an audio signal processing unit; and
  encoding the input audio signal by the audio signal processing unit within the communication network based on the VADD;
  wherein the modified signal to noise ratio (mssnr) is calculated by adding the sub-band specific parameter (sbsp) of each sub-band as follows:

$$mssnr = \sum_{i=0}^{N} sbsp(i)$$

wherein N is the number of frequency sub-bands into which the input frame is divided, sbsp(i) is the sub-band specific parameter of the $i^{th}$ sub-band calculated based on the signal to noise ratio of the $i^{th}$ sub-band using the adaptive function; and
  wherein the sub-band specific parameter of the $i^{th}$ sub-band sbsp(i) is calculated as follows:

$sbsp(i)=f(snr(i))+\alpha)^{\beta}$ wherein snr(i) is the signal to noise ratio of the $i^{th}$ sub-band of the received frame of the input audio signal, $(f(snr(i))+\alpha)^{\beta}$ is the adaptive function used to calculate the sub-band specific parameter sbsp(i), and $\alpha$, $\beta$ are two configurable variables of the adaptive function.

2. The method according to claim 1, wherein the noise characteristic of the input audio signal is one of:
  a long term signal to noise ratio,
  a background noise variation, or
  a long term signal to noise ratio and a background noise variation.

3. The method according to claim 1, wherein the adaptive function is a non-linear function.

4. The method according to claim 1, wherein the signal to noise ratio of each of the sub-bands is obtained by:
  obtaining a signal energy for each of the sub-bands,
  estimating a background noise energy for each of the sub-bands, and
  calculating the signal to noise ratio of each of the sub-bands based on the signal energy and the background noise energy of the respective sub-band.

5. The method according to claim 4, wherein the signal energy of each sub-band is a smoothed signal energy, said smoothed signal energy is a weighted average between the signal energy of the sub-band in the received frame and the signal energy of the sub-band in at least one previously received frame.

6. The method according to claim 1, wherein the variable $\alpha$ of the adaptive function depends on a long term signal to noise ratio (lsnr) of the input audio signal as follows:

$\alpha=g(i,\text{lsnr})$ wherein g(i, lsnr) is a linear or non-linear function,
  and wherein the variable $\beta$ of the adaptive function depends on the long term signal to noise ratio (lsnr) of the input audio signal and $\phi$:

$\beta=h(\text{lsnr},\phi)$ wherein h(lsnr, $\phi$) is a non-linear function and $\phi=f(snr(i))+\alpha$.

7. The method according to claim 6, wherein the variable $\alpha$ of the adaptive function is calculated through the function g(i, lsnr) by:

$\alpha=g(i,\text{lsnr})=a(i)\text{lsnr}+b(i)$ wherein a(i) and b(i) are real numbers depending on a sub-band index i ($1 \le i \le N$), and wherein the variable $\beta$ of the adaptive function is calculated through the function $\beta=h(\text{lsnr}, \phi)$ by:

$$\beta = h(lnsr, \varphi) = \begin{cases} \beta_1 & \varphi \ge d \text{ and } lsnr > e_2 \\ \beta_2 & \varphi \ge d \text{ and } e_1 < lsnr \le e_2 \\ \beta_3 & \varphi \ge d \text{ and } lsnr \le e_1 \\ \beta_4 & \text{otherwise} \end{cases}$$

wherein $\beta_1$, $\beta_2$, $\beta_3$, $\beta_4$, d, $e_1$ and $e_2$ are integer or floating numbers, $\beta_1 < \beta_2 < \beta_3$ and $e_1 < e_2$, and wherein lsnr is the long term signal to noise ratio.

8. The method according to claim 6, wherein the derived modified segmental signal to noise ratio (mssnr) is compared with a threshold value (thr) being set to:

$$thr = \begin{cases} k_1 & lsnr > e_2 \\ k_2 & e_1 < lsnr \le e_2 \\ k_3 & lsnr \le e_1 \end{cases}$$

wherein $k_1 > k_2 > k_3$ and $e_1 < e_2$ are integer or floating numbers, lsnr is the long term signal to noise ratio,
  and wherein the voice activity detection decision (VADD) is generated as follows:

$$VADD = \begin{cases} 1 & mssnr > thr \\ 0 & mssnr \le thr \end{cases}$$

wherein VADD=1 indicates that the received frame is an active frame with voice activity being present;

and VADD=0 indicates that the received frame is a passive frame with voice activity being absent.

9. The method according to claim 1, wherein the variable α of the adaptive function depends on a long term signal to noise ratio (lsnr) of the input audio signal and an estimated background noise variation (ε) as follows:

$$\alpha = g(i, \text{lsnr}, \varepsilon) = a(i)\text{lsnr} + b(i) + c(\varepsilon)$$

wherein a(i), b(i) are real numbers depending on a sub-band index i (1≤i≤N) and c(ε) is a real number depending on the estimated fluctuation of the background noise of the input audio signal, and wherein the variable β of the adaptive function is calculated by:

$$\beta = h(\text{lnsr}, \varphi, \varepsilon) = \begin{cases} \beta_1 & \varphi \geq d \text{ and } \text{lsnr} > e_2 \text{ and } \varepsilon \leq p \\ \beta_2 & \varphi \geq d \text{ and } \text{lsnr} > e_2 \text{ and } \varepsilon > p \\ \beta_3 & \varphi \geq d \text{ and } e_1 < \text{lsnr} < e_2 \text{ and } \varepsilon \leq p \\ \beta_4 & \varphi \geq d \text{ and } e_1 < \text{lsnr} < e_2 \text{ and } \varepsilon > p \\ \beta_5 & \varphi \geq d \text{ and } \text{lsnr} \leq e_1 \text{ and } \varepsilon \leq p \\ \beta_6 & \varphi \geq d \text{ and } \text{lsnr} \leq e_1 \text{ and } \varepsilon > p \\ \beta_7 & \varphi < d \end{cases}$$

wherein $\varphi = f(\text{snr}(i)) + \alpha$, $\beta_1$-$\beta_7$, d, p, $e_1$ and $e_2$ are integer or floating numbers, lsnr is the long term signal to noise ratio, and $e_1 < e_2$.

10. The method according to claim 9, wherein the derived modified segmental signal to noise ratio (mssnr) is compared with a threshold value (thr) being set to:

$$thr = \begin{cases} q_1 + r_1 \cdot \text{Min}\left[\frac{\text{lsnr} - v_1}{W_1}, 1\right] & \text{lsnr} > e_2 \\ q_2 + r_2 \cdot \text{Min}\left[\frac{\text{lsnr} - v_2}{W_2}, 1\right] & e_1 < \text{lsnr} \leq e_2 \\ q_3 + r_3 \cdot \text{Max}\left[\frac{\text{lsnr} - v_3}{W_3}, 1\right] & \text{lsnr} \leq e_1 \end{cases}$$

wherein $q_1, q_2, q_3, r_1, r_2, r_3, e_1, e_2, v_1, v_2, v_3$ and $W_1, W_2, W_3$ are integer or floating numbers, $e_1 < e_2$;

and wherein the voice activity detection decision (VADD) is generated as follows:

$$VADD = \begin{cases} 1 & \text{mssnr} > thr \\ 0 & \text{mssnr} \leq thr \end{cases}$$

wherein VADD=1 indicates that the received frame is an active frame with voice activity being present;

and VADD=0 indicates that the received frame is a passive frame with voice activity being absent.

11. An apparatus for detecting a voice activity in an input audio signal, wherein the input audio signal is composed of frames, comprising:
   a receiver, configured to receive the input audio signal;
   a voice activity detection (VAD) device, configured to:
      determine a noise characteristic of the input audio signal based on the received frames of the input audio signal,
      divide each of the received frames of the input audio signal into one or more frequency sub-bands,
      obtain a signal to noise ratio for each of the sub-bands,
      calculate a sub-band specific parameter (sbsp) of each sub-band based on the signal to noise ratio of the sub-band using an adaptive function, wherein at least one parameter of the adaptive function is selected depending on the noise characteristic of the input audio signal,
      derive a modified segmental signal to noise ratio (mssnr) as a voice activity detection (VAD) parameter by adding the calculated sub-band specific parameter (sbsp) of each sub-band, and
      compare the derived VAD parameter with a threshold value to provide a voice activity detection decision (VADD) to an audio signal processing unit; and
   the audio signal processing unit, configured to encode the input audio signal based on the VADD,
   wherein the modified signal to noise ratio (mssnr) is calculated by adding the sub-band specific parameter (sbsp) of each sub-band as follows:

$$mssnr = \sum_{i=0}^{N} sbsp(i)$$

wherein N is the number of frequency sub-bands into which the input frame is divided, sbsp(i) is the sub-band specific parameter of the $i^{th}$ sub-band calculated based on the signal to noise ratio of the $i^{th}$ sub-band using the adaptive function; and wherein the sub-band specific parameter of the $i^{th}$ sub-band sbsp(i) is calculated as follows:

$$sbsp(i) = (f(\text{snr}(i)) + \alpha)^{\beta}$$

wherein snr(i) is the signal to noise ratio of the $i^{th}$ sub-band of the received frame of the input audio signal, $(f(\text{snr}(i)) + \alpha)^{\beta}$ is the adaptive function used to calculate the sub-band specific parameter sbsp(i), and α, β are two configurable variables of the adaptive function.

12. The apparatus according to claim 11, wherein the noise characteristic of the input audio signal is one of:
   a long term signal to noise ratio,
   a background noise variation, or
   a long term signal to noise ratio and a background noise variation.

13. The apparatus according to claim 11, wherein the adaptive function is a non-linear function.

14. The apparatus according to claim 11, wherein in obtaining the signal to noise ratio of each of the sub-bands, the VAD device is configured to:
   obtain a signal energy for each of the sub-bands,
   estimate a background noise energy for each of the sub-bands, and
   calculate the signal to noise ratio of each of the sub-bands based on the signal energy and the background noise energy of the respective sub-band.

15. The apparatus according to claim 14, further comprising an audio signal processor, wherein the audio signal processor is configured to process the audio input signal according to the VADD.

16. The apparatus according to claim 14, wherein the signal energy of each sub-band is a smoothed signal energy, said smoothed signal energy is a weighted average between the signal energy of the sub-band in the received frame and the signal energy of the sub-band in at least one previously received frame.

17. The apparatus according to claim 11, wherein the variable α of the adaptive function depends on a long term signal to noise ratio (lsnr) of the input audio signal as follows:

$$\alpha = g(i, \text{lsnr})$$

wherein g(i, lsnr) is a linear or non-linear function.

* * * * *